(Model.)
2 Sheets—Sheet 1.
E. P. & J. M. KARR.
POTATO PLANTER.
No. 267,899. Patented Nov. 21, 1882.
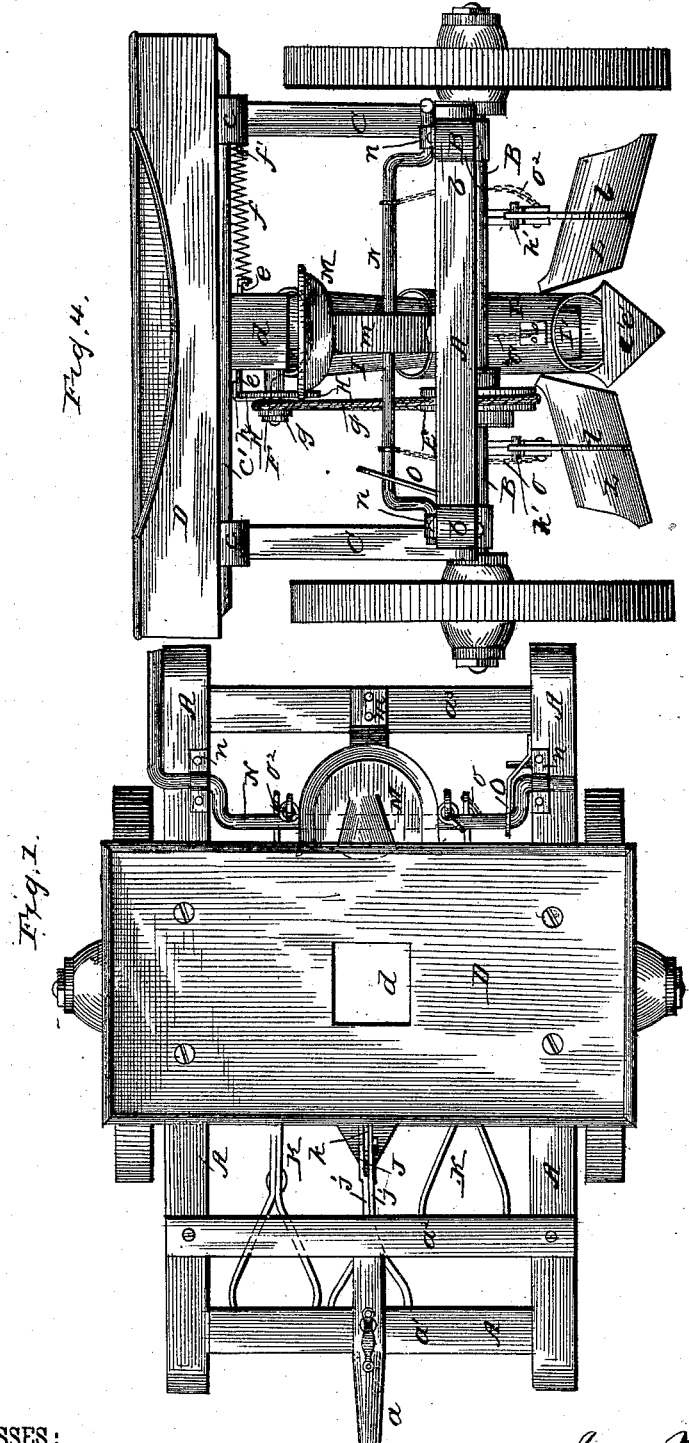
WITNESSES:
Fred. G. Dieterich
Geo. W. Stockelt.
INVENTORS.
James M. Karr.
Edward P. Karr.
by C. W. Stevens, ATTORNEY (Model.)
2 Sheets—Sheet 2.
E. P. & J. M. KARR.
POTATO PLANTER.
No. 267,899.
Patented Nov. 21, 1882.
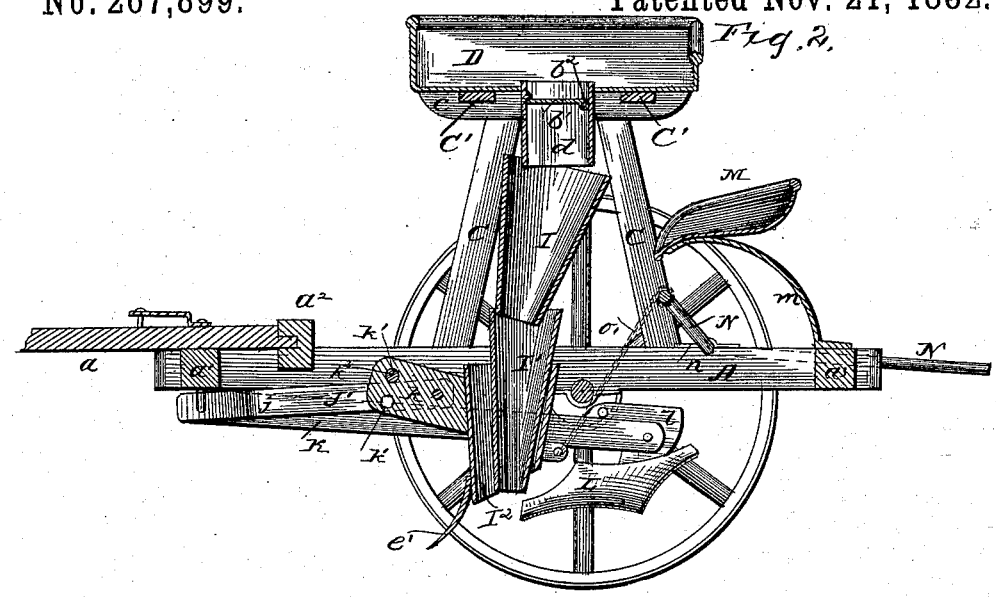
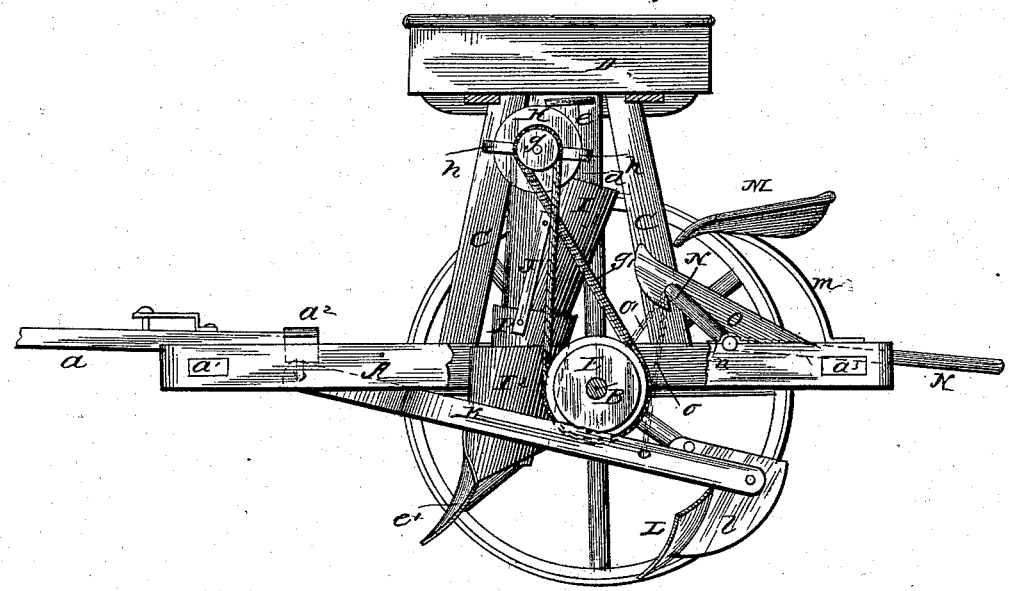
WITNESSES:
Fred. G. Dieterich.
Jno. W. Stockett
INVENTORS,
James M. Karr.
Edward P. Karr.
by C. W. Stevens, ATTORNEY

UNITED STATES PATENT OFFICE.

EDWARD P. KARR AND JAMES M. KARR, OF ALMOND, NEW YORK.

POTATO-PLANTER.

SPECIFICATION forming part of Letters Patent No. 267,899, dated November 21, 1882.

Application filed July 7, 1882. (Model.)

*To all whom it may concern:*

Be it known that we, EDWARD P. KARR and JAMES M. KARR, citizens of the United States, residing at Almond, in the county of Allegany and State of New York, have invented certain new and useful Improvements in Potato-Planters; and we do hereby declare the following to be a full, clear, and exact description of the invention, such as will enable others skilled in the art to which it appertains to make and use the same.

Our invention relates to certain new and useful improvements in potato-planters; and the invention consists in novel features of construction and combination and arrangement of parts, all as will be hereinafter fully described, and set forth in the claims hereto annexed.

Referring to the accompanying drawings, Figure 1 represents a top view or plan of our improved machine; Fig. 2, a longitudinal vertical central section of the same; Fig. 3, a side elevation of the left-hand of the machine, with wheel removed and portion of frame broken away to show some of the operating parts thereof; Fig. 4, a rear elevation.

In the drawings, A represents the usual main or supporting frame; $a$, the tongue, connected to the front cross-beams, $a'$ $a^2$, of the frame in any suitable manner; and B, the shaft upon which the drive-wheels are mounted, said shaft being journaled in suitable bearings secured to the under side of the side beams, $b$, of the frame.

C C represent two uprights secured to each of the side beams, $b$, and which uprights are connected at their upper ends by cross-ties $c$ $c$, which are connected together by transverse ties $c'$ $c'$, which form the frame-work, and upon which is mounted and secured the large rectangular box or hopper D for the reception of the potatoes to be planted.

Centrally arranged in the box or hopper D, and projecting down through the same, is a small bottomless hopper, $d$, provided with an automatic hinged valve, $b'$, for closing the small hopper. This valve $b'$ is mounted on a shaft, $b^2$, which passes transversely through the lower end of the small hopper $d$, and is provided with crank-arms $e$ $e$ at its ends, outside of the hopper, and to one of the cranks $e$ is connected one end of a coiled spring, $f$, which is connected at its other end to a lug, $f'$, projecting from the inner side of one of the cross-ties $c'$, which spring operates to close the valve after it has been opened by means as will now be described.

Securely mounted upon the main shaft B is a pulley, E, and upon a stub-axle, F, secured to the side of small hopper $d$, is loosely mounted a small pulley, $g$, which pulleys are connected by a cross-belt, $g'$, by which motion is communicated to the pulley $g$ through the medium of the main shaft B and pulley E, mounted thereon.

To the inner side of the pulley $g$ is secured a disk, H, of larger diameter, having inwardly-projecting lugs $h$ at or near its periphery, which engage with the crank $e$ in the revolution of said disk and open the valve for discharging the potato or a portion thereof placed in the small hopper $d$ by the operator, which crank $e$, when released from the lug, as the disk continues to revolve, permits the valve to be automatically returned to its normal position for closing said small hopper by the spring $f$, connected to the crank $e$, as before described. By this construction the spring is arranged in a compact protected position, and acts torsionally to close the valve, and by means of the connection of the disk directly and with a cross-belt to the main axle, the use of an intermediate gear, as usual, is avoided. The projecting lugs $h$ may be arranged at such intervals and the size of the disk increased or decreased so as to plant the rows any desired distance apart as may be deemed expedient. From said small hopper the potato or parts thereof placed therein to be planted are discharged through the sectional tubes I I' I² into the furrow formed by the opener $e'$, secured to the lower and front end of the tube I². These tubes are secured one within the other, as shown, the tubes I I' being pivotally connected together and to the sides of the tube $d$ by flexible straps J J— that is to say, straps J, similarly connected and arranged to those shown in Fig. 3, are applied to the upper tube, I, and to the hopper $d$, in a manner readily apparent. The forward and upper end of the lower tube, I², is pivotally connected to the drag-bar J', composed of two parallel metallic bars, $jj$, connected together, but having their forward ends diverging and pivoted to the under side of the cross-beam $a'$ of the frame A, and between the rear ends of said bars $jj$ is pivotally connected a bar, $k$, projecting and rigidly secured to the upper and front end of the said tube, which bar $k$ at its forward end is provided with a series of holes, $k'$, through which a pin, $k^2$, passes and engages the upper end of said bar, thereby limiting the downward movement of said tube, which can be more or less limited by changing the pin in said holes.

To the under side of the cross-bars $a'$ and $a^2$ of the frame are pivotally connected drag-bars K K, constructed similar to drag-bar J', and having pivoted between their rear ends the coverers L L, the shanks $ll$ extended forward, and provided with holes and pins similar to those of the bar $k$, connected to the tube $I^2$, and for the same purpose.

M represents the seat of the operator, arranged in rear of the hopper D and supported by a standard, $m$, connected and supported upon the rear cross-beam, $a^3$, of the frame A.

N represents a crank-shaft journaled to the upper part of the frame A in bearings $n$, one end of one of the cranks extending upward in reach of the operator. To this crank-shaft is connected by chains $o\ o'\ o^2$ the tube $J^2$ and drag-bars K K, by which the operator can raise and lower the tube and drag-bars when deemed expedient, and which are held in a raised position, so that the furrow opener and coverers will be clear of the ground, by means of a catch-bar, O.

The driver may walk or have a seat in front of the hopper D, supported by standards connected to the forward frame of the machine.

The operation is as follows: The machine in passing over the field to be planted operates the valve in small hopper through the mechanism before described, and the operator who occupies the seat M places in the small hopper a potato or portion thereof taken from the large hopper D, and which, when discharged from the small hopper by the valve, is replaced by another one or portion thereof as soon as the valve is returned to its normal position. The potato or portion is discharged from the small hopper into and passes down through the tubes I I' $I^2$ into the furrow formed by the furrow-opener, and is covered up by the furrow-coverers L. The object of the sectional tubes telescoping one within the other is to permit the lower tube, $I^2$, carrying the furrow-opener, to be raised clear of the ground.

Having thus fully described our invention, what we claim as new, and desire to secure by Letters Patent, is—

1. The combination, in a potato-planter, of the main frame, shaft, drive-wheels, pulley E, mounted on said shaft, stub-axle secured to a small hopper, $d$, and pulley $g$, loosely mounted thereon, connecting cross-belt $g'$, disk H, secured to pulley $g$, and having projecting lugs $h$, double-crank shaft upon which the valve is mounted, adapted to be alternately operated by the lugs on the disk as it revolves, and a spring for automatically opening and closing the hopper $d$, substantially as herein shown and described.

2. The combination of the hopper $d$, valve $b'$, shaft $b^2$, crank $e$, coiled spring $f$, lug $f'$, and cross-bar $c$, whereby said spring is adapted to close the valve automatically and by torsional resistance, substantially as shown and described.

3. The combination of hopper $d$, valve $b'$, shaft $b^2$, cranks $e$, spring $f$, disk H, having lugs $h$, and means for rotating the disk, substantially as shown and described.

In testimony whereof we affix our signatures in presence of two witnesses.

EDWARD P. KARR.
JAMES M. KARR.

Witnesses:
JAMES H. STEVENS, Jr.,
SHIRLEY E. BROWN.